United States Patent [19]

Westling

[11] Patent Number: 4,514,644
[45] Date of Patent: Apr. 30, 1985

[54] OCEAN POWERED PUMP

[76] Inventor: Wayne A. Westling, 1530 21st St., Manhattan Beach, Calif. 90266

[21] Appl. No.: 522,506

[22] Filed: Aug. 12, 1983

[51] Int. Cl.³ ............................................. F03B 13/12
[52] U.S. Cl. ...................................... 290/53; 60/499; 416/142; 417/332
[58] Field of Search .................... 290/42, 53; 417/100, 417/330–332; 60/495, 499, 506, 507; 416/142 B

[56] References Cited

U.S. PATENT DOCUMENTS

| | | | |
|---|---|---|---|
| 626,162 | 5/1899 | Hartwell | 417/332 |
| 988,508 | 4/1911 | Reynolds | 417/330 |
| 1,072,272 | 9/1913 | Thomas | 60/499 |
| 1,617,568 | 2/1927 | Bloss | 60/499 |
| 4,034,231 | 7/1977 | Conn et al. | 290/42 |
| 4,400,940 | 8/1983 | Watabe et al. | 417/330 |

FOREIGN PATENT DOCUMENTS 524073  5/1931  Fed. Rep. of Germany ... 416/142 B

*Primary Examiner*—Stanley J. Witkowski
*Assistant Examiner*—Shelley Wade
*Attorney, Agent, or Firm*—Keith D. Beecher

[57] ABSTRACT

A pumping unit suitable for driving an electric generator and which is powered by ocean surf and waves. The unit includes a tower which is located on an ocean beach, and which includes a generally horizontal boom. The boom includes two forward sections disposed at right angles to one another. Two blades are mounted on the respective ends of the forward sections, and the forward sections are controlled so that the blades can be alternately dropped into the water to be driven toward the shore by the incoming surf and waves. As one blade is driven to the shore, it turns the boom in one direction about the vertical axis, causing the other blade to be moved out over the water. Then, the first blade can be lifted out of the water, and the second blade dropped into the water, so that the incoming surf will drive the second blade towards the shore turning the boom in the opposite direction about the vertical axis. The cycle is then repeated, and the resulting action is for the boom to turn reciprocally about the vertical axis. The boom is coupled to a pump, and its reciprocal action causes the pump to perform a desired pumping action.

2 Claims, 3 Drawing Figures

OCEAN POWERED PUMP

BRIEF DESCRIPTION OF THE ILLUSTRATED DRAWINGS

DETAILED DESCRIPTION OF THE ILLUSTRATED EMBODIMENT

Figure 1:
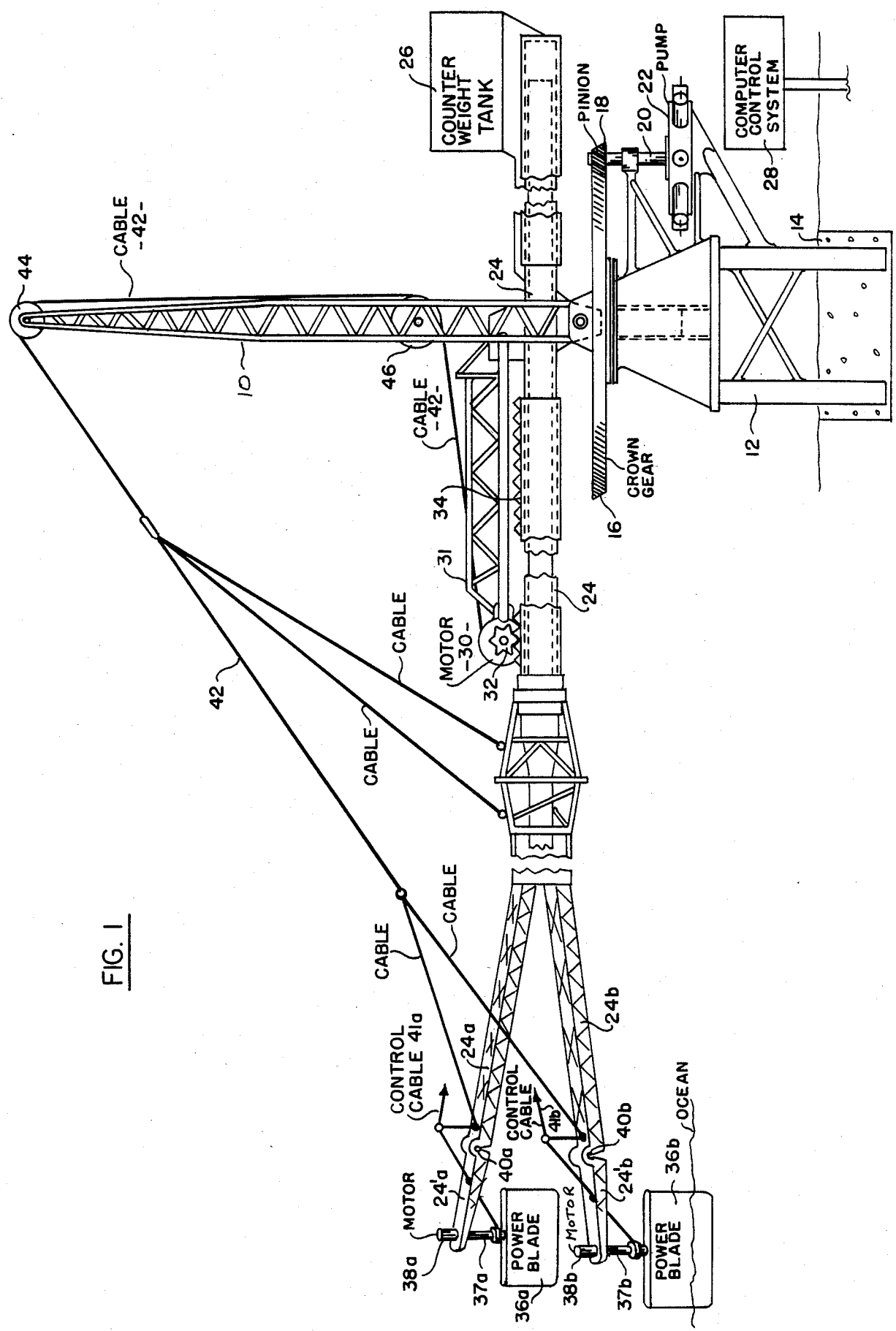
FIG. 1 is a side elevation of an assembly representing one embodiment of the present invention.

The assembly of FIG. 1 is designed to be erected on an ocean beach. It includes a vertical tower 10 which may be mobile, and which may be moved along tracks down onto the beach; or it may be rotatably mounted on a base 12, as illustrated, the base being supported on a concrete block 14 which, in turn, is embedded in the sand of the beach.

The tower 10 is rotatable about a vertical axis. A horizontal crown gear 12 is attached to the lower end of the tower in coaxial relationship with the vertical axis. A pinion gear 18 is mounted on the base, and it is coupled to the gear 16 and keyed to a shaft 20 which drives a pump 22.

As tower 10 is turned reciprocally about the vertical axis, shaft 20 also turns reciprocally to operate pump 22. Pump 22 is caused to pump an appropriate fluid to drive an electric generator. For example, pump 22 may be a double acting pump, and with each stroke, it may be caused to pump water to an elevated position so that it may be used to drive a turbine. Alternatively, the pump may be used to compress air, which also may be used to drive an electric turbine.

A horizontal boom 24 is mounted on tower 10, and it extends radially outwardly from the vertical axis on both sides of the tower. The boom 10 may be composed of a number of telescopically arranged coaxial tubular sections composed, for example, of aluminum so as to be extensible. Tower 10, and portions of the boom may be constructed as trusses, as shown, of any appropriate material.

A tank 26 is supported on the right hand end of boom 24. Appropriate liquid, such as water, is pumped into tank 26 to act as a counter weight for the load on the left hand end of the boom. The amount of water pumped into the tank 26 at any particular time, and other operations of the assembly of FIG. 1, are controlled by a computer control system represented by block 28.

The left hand end of the boom 24 may be extended or retracted by a drive motor 30 which is supported on a truss 31, the truss being attached to tower 10. Motor 30 drives a pinion 32 which engages a rack 34. The motor may be caused to turn in either direction under the control of the computer control system 28 to extend or retract the left hand end of the boom. The right hand end of boom 28, on which the counter weight tank is mounted, may be simultaneously extended or retracted if so desired.

A pair of trusses 24A and 24B, positioned at 90° or more to one another, are mounted on the left hand end of boom 24. Truss 24A has an end section 24'a which is hinged by a hinge 40A, and the end section 24'a may be turned up by means of a control cable 41a. Likewise, truss 24b has an end section 24'b hinged to it by a hinge 40b, and end section 24'b may be turned up by means of a control cable 41B.

A power blade 36a is mounted on the end of section 24'a by means of a shaft 37a, and the power blade may be turned by a servo motor 38a. A similar power blade 36b is mounted on the end of section 24'b by means of a shaft 37b, and power blade 36b may be turned by a servo motor 38b. Servo motors 38a and 38b are controlled by the computer control system 28. The power blades are controlled so that when either one is dropped into the water, it is turned to face the incoming surf.

Control cables 41a and 41b may be wound on respective power reels which, in turn, are controlled by the computer control system 28. The arrangement is such that when the boom is turned so that one of the power blades is located out over the water, that particular blade is dropped into the water, and the incoming surf drives the blade to the shore, turning the boom about the vertical axis in a first direction and, at the same time, causing the second blade to be move out over the water. When the first blade reaches the shore, it is raised up, and the other blade is dropped into the water. The surf now drives the other blade into the shore, turning the boom in the opposite direction about the vertical axis, and causing the first blade to move back out over the water, so that the cycle may be repeated. This action causes the crown gear 16 to drive pump 22 through pinion gear 18 and shaft 20 in a reciprocal manner to operate the pump.

The left hand end of boom 24 is supported by a cable 42 which extends over a pulley 44 at the top of the tower and around a second pulley 46 to a power reel driven by motor 30. Cable 42 serves to maintain the left hand end of the boom in a generally horizontal position as the boom is extended and retracted, and for that purpose, the cable is reeled and unreeled on the power reel by motor 30 simultaneously with the retraction and extension of the boom. The amount of liquid in tank 26, and the extension of the right hand end of the boom may simultaneously be controlled by computer 28 to assist in maintaining the boom in a horizontal position.

The control of the cable 42 and of the liquid in counter weight tank 26 are such that when the individual blades are lowered into the water, they are immersed in the water at the proper depth. Sensors are provided in the ocean to monitor the wave action, and signals from these sensors are applied to computer 28 so that the power blades 36a and 36b will be automatically positioned to the proper depth despite changes in wave action.

Figure 3:
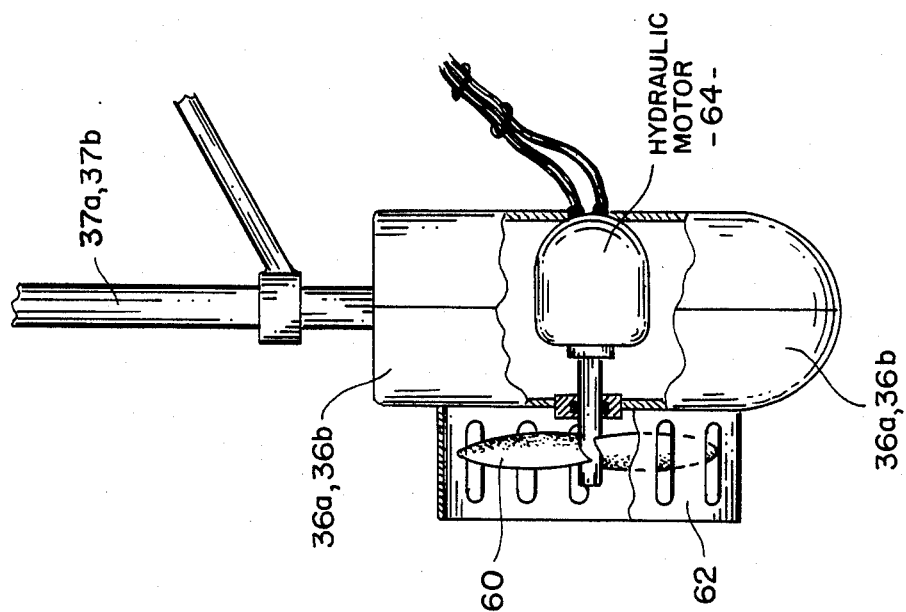
FIG. 3 is an end elevational view of the component of FIG. 2.
Figure 2:
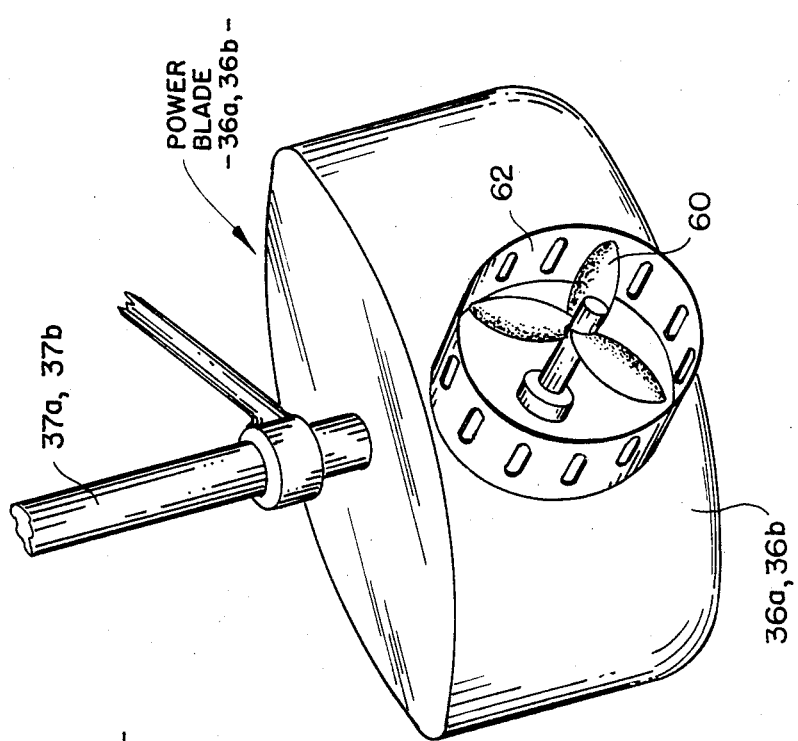
FIG. 2 is a perspective view of one of the components of the assembly of FIG. 1.

Each of the power blades 36a and 36b is in the form of an airtight pontoon as best shown in FIGS. 2 and 3. A propeller 60 is mounted on each power blade within a shroud 62. The propeller is driven by an hydraulic motor 64 which is controlled by computer 28 so as to speed up or slow down the blade in correspondence with the demand of the surf and waves.

When the end section 24'a of truss 24a is dropped into the water under the control of computer 28, servo motor 38a is activated to turn the blade 36a across the incoming surf. The blade is then driven towards the shore by the surf, turning the boom 10 and gear 16 around the vertical axis. When the blade 36a is driven to the shore, the end section 24'a is turned up to pick the blade 36a out of the water. At this time, and as pointed out above the end section 24'b of truss 24b and blade 36b have been moved out over the water, and the blade 36b is then dropped into the water. The blade 36b is then properly oriented by servo motor 34b, and it is driven towards the shore by the surf, causing the boom 10 to turn gear 16 in the opposite direction about the vertical axis. When the blade 36b reaches the shore, it is picked up out of the water, and the cycle is repeated.

In the manner described above, pump 22 is driven reciprocally and caused to pump fluid which may be used to drive an electric generator.

It will be appreciated that while a particular embodiment of the invention has been shown and described, modifications may be made. It is intended in the claims to cover all modifications which come within the true spirit and scope of the invention.

What is claimed is:

1. A wave motor comprising:
  (a) a first member mounted for rotation;
  (b) a generally horizontal boom adapted to rotate about a vertical axis, driving said first member;
  (c) a blade means attached to said boom at an end remote from said first member, said blade means movably attached to said boom so as to controllably be extended into a wave affected body of water or be raised from it without moving said boom;
  (d) means to extend said blade into said water at a first predetermined location of the boom relative to said body of water to effect a wave driven motion of the boom;
  (e) means to raise said blade out of said water after said wave driven motion at a second predetermined location of the boom relative to said body of water; and
  (f) means to return said boom to its first predetermined location.

2. The wave motor of claim 1, wherein the means to return said boom is a second blade means attached and controllable as the first blade means.

* * * * *